(12) United States Patent
Hayes et al.

(10) Patent No.: US 11,367,210 B1
(45) Date of Patent: *Jun. 21, 2022

(54) SMOOTHLY CHANGING A FOCUS OF A CAMERA BETWEEN MULTIPLE TARGET OBJECTS

(71) Applicant: Weta Digital Ltd., Wellington (NZ)

(72) Inventors: Eric S. Hayes, Calgary (CA); Robert S. Hurlburt, Los Angeles, CA (US); Corey B. Frew, Los Angeles, CA (US)

(73) Assignee: Unity Technologies SF, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,766

(22) Filed: Nov. 12, 2021

Related U.S. Application Data

(63) Continuation of application No. 17/378,489, filed on Jul. 16, 2021, now Pat. No. 11,232,579.

(Continued)

(51) Int. Cl.
*G06T 7/571* (2017.01)
*H04N 5/232* (2006.01)
(Continued)

(52) U.S. Cl.
CPC .............. *G06T 7/571* (2017.01); *G06T 15/20* (2013.01); *H04N 5/2226* (2013.01);
(Continued)

(58) Field of Classification Search
CPC ..................... G06T 7/571; G06T 15/20; G06T 2207/10028; G06T 2207/10148; H04N 5/2226; H04N 5/23212
See application file for complete search history.

(56) References Cited

U.S. PATENT DOCUMENTS

| 6,909,443 B1 | 6/2005 | Robertson et al. |
| 7,428,482 B2 | 9/2008 | Clavadetscher |

(Continued)

FOREIGN PATENT DOCUMENTS

AU 2014280961 A1 7/2016

OTHER PUBLICATIONS

International Searching Authority, International Search Report and Written Opinion, PCT Patent Application PCT/IB2021/059428, dated Mar. 7, 2022, 16 pages.

(Continued)

*Primary Examiner* — Jared Walker
(74) *Attorney, Agent, or Firm* — Perkins Coie LLP

(57) ABSTRACT

Disclosed herein is a system to smoothly change the focus of a camera between multiple targets. The system can obtain an indication of a target, an indication of a manner of focus transition between a first target and a second target, and camera settings. The system can determine a point associated with the second target, where the point has a property that focusing the camera on the point places the second target in focus, and the point is closer to the current focus point of the camera than a substantial portion of other points having the property. The system can obtain a nonlinear function indicating a second manner of focus transition between the first target and the second target. The system can change the focus of the camera between the first target and the second target by changing the focus of the camera from the current focus point to the determined point based on the nonlinear function.

27 Claims, 14 Drawing Sheets

Related U.S. Application Data

(60) Provisional application No. 63/222,287, filed on Jul. 15, 2021.

(51) Int. Cl.
    *G06T 15/20*         (2011.01)
    *H04N 5/222*       (2006.01)

(52) U.S. Cl.
    CPC ............... *H04N 5/23212* (2013.01); *G06T 2207/10028* (2013.01); *G06T 2207/10148* (2013.01)

(56) References Cited

U.S. PATENT DOCUMENTS

| | | |
|---|---|---|
| 7,466,317 B2 | 12/2008 | Noyle |
| 8,576,235 B1 | 11/2013 | Sumner et al. |
| 9,047,389 B2 | 6/2015 | Aoki et al. |
| 9,519,972 B2 | 12/2016 | Venkataraman et al. |
| 9,626,786 B1 | 4/2017 | Reynolds et al. |
| 10,933,324 B2 | 3/2021 | Gewickey et al. |
| 11,232,579 B1 | 1/2022 | Hayes et al. |
| 11,245,833 B1 | 2/2022 | Hayes et al. |
| 11,263,766 B1 | 3/2022 | Hayes et al. |
| 2002/0158888 A1 | 10/2002 | Kitsutaka |
| 2005/0187015 A1 | 8/2005 | Suzuki et al. |
| 2009/0153474 A1 | 6/2009 | Quennesson |
| 2010/0085351 A1 | 4/2010 | Deb et al. |
| 2011/0026014 A1 | 2/2011 | Mack et al. |
| 2011/0085142 A1 | 4/2011 | Pace et al. |
| 2011/0141334 A1 | 6/2011 | Kuriyama |
| 2012/0200498 A1 | 8/2012 | Quennesson |
| 2012/0300035 A1 | 11/2012 | Okamoto |
| 2013/0169754 A1 | 7/2013 | Aronsson et al. |
| 2013/0188090 A1 | 7/2013 | Saito |
| 2014/0316543 A1 | 10/2014 | Sharma et al. |
| 2014/0354631 A1 | 12/2014 | Yamaoka |

OTHER PUBLICATIONS

International Searching Authority, International Search Report and Written Opinion, PCT Patent Application PCT/IB2021/059429, dated Mar. 10, 2022, 16 pages.

SMOOTHLY CHANGING A FOCUS OF A CAMERA BETWEEN MULTIPLE TARGET OBJECTS

CROSS-REFERENCE TO RELATED APPLICATIONS

This application is a continuation of the U.S. utility patent application Ser. No. 17/378,489 filed Jul. 16, 2021, which claims priority to the U.S. provisional patent application Ser. No. 63/222,287 filed Jul. 15, 2021 which is incorporated herein by reference in its entirety.

BACKGROUND

The current focusing systems for computer graphics (CG) cameras use linear interpolation between positions of two target objects, namely, the first target object on which the camera is focused, and the second target object to which the focus is transitioning. When the two target objects are far away, the focusing between the positions of the two target objects can produce popping in the focus, e.g., popping in the change in blur of the elements in the image.

BRIEF DESCRIPTION OF THE DRAWINGS

Detailed descriptions of implementations of the present invention will be illustrated and explained through the use of the accompanying drawings.

Figure 1:
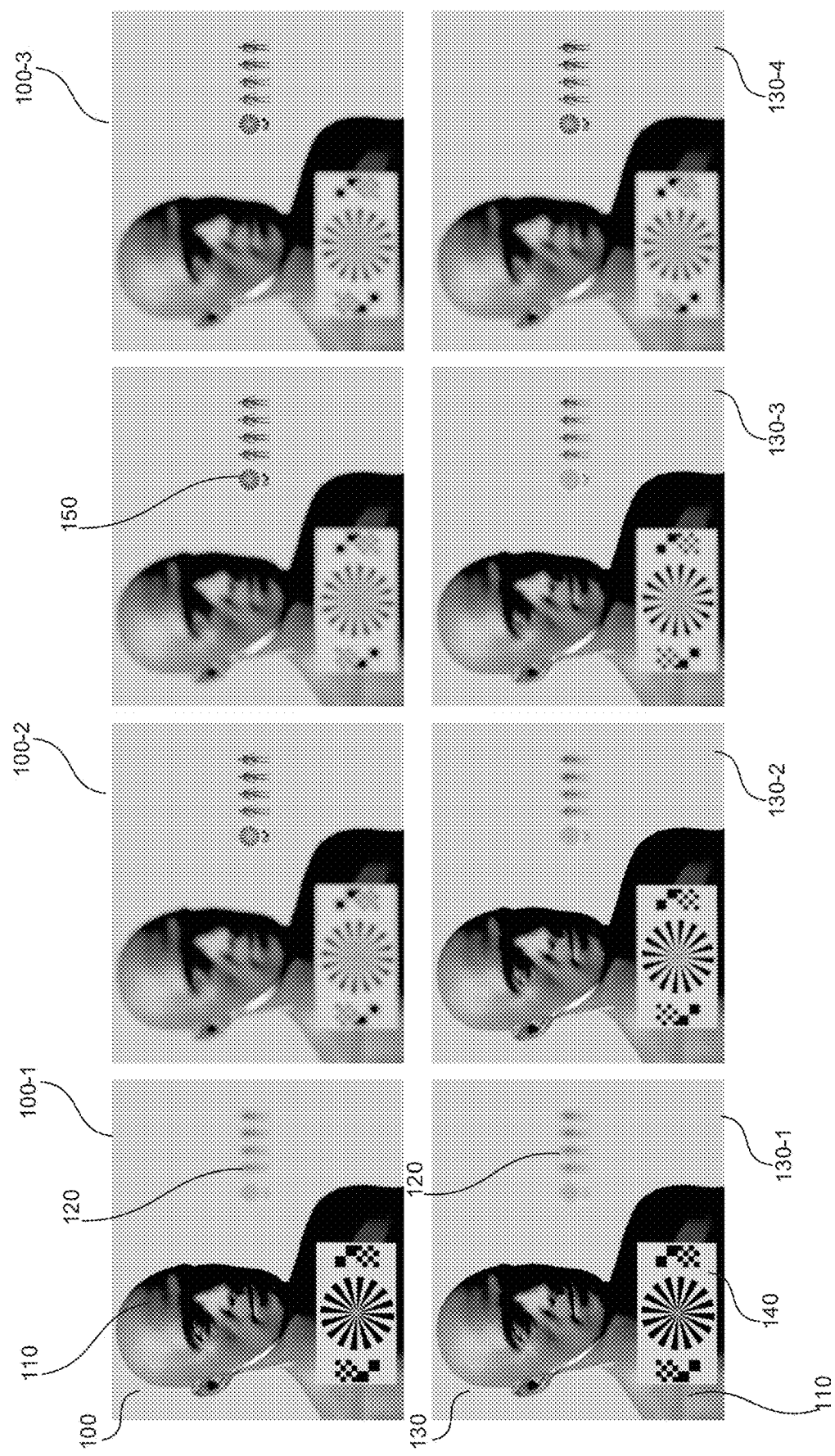
FIG. 1 shows changing a focus between two target objects in a scene according to two different methods.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein is a system and method to smoothly change the focus of a computer graphics (CG) camera between multiple target objects. The system can obtain an indication of each target object, such as the geometry and the position of each target object. The system can obtain an indication of a manner of focus transition between a first target object and a second target object. The indication of the manner of focus transition can be a length of time to transition between the two targets or a weight associated with each target position, which indicates the focus position of the camera between the two target positions. The system can obtain CG camera settings such as the current focus point of the CG camera, the position of the camera, and an indication of a depth of field of the CG camera. The CG camera is configured to transition the focus from the first target object to the second target object. The depth of field is the distance between the nearest object and the farthest object that are in focus in an image formed by the CG camera. The depth of field can depend on various camera settings such as aperture, current focus point, and focal length of the lens. The system can determine a second depth of field associated with the second target object, where the second depth of field indicates a near distance to the CG camera and a far distance to the CG camera, such that when a focus point of the CG camera is between the near distance and the far distance, an object located between the near distance and the far distance is in focus. The system can determine a point between the near distance and the far distance closest to the current focus point of the CG camera. The system can obtain a nonlinear function indicating a smooth manner of focus transition between the first target object and the second target object. The system can smoothly change the focus of the CG camera between the first target object and the second target object by changing the focus of the CG camera from the current focus point to the point within the second depth of field closest to the current focus point. The system can smoothly change the focus based on the nonlinear function.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Smoothly Change a Focus of a Camera Between Multiple Target Objects

FIG. 1 shows changing a focus between two target objects in a scene according to two different methods. The row of images 100 shows a change in focus of a camera between the first target object ("first target") 110 and the second target object ("second target") 120 over 24 frames of a video or a film using a traditional system. The camera can be a computer graphics (CG) camera, or can be a physical camera. Image 100-1 shows the initial frame in the sequence where the CG camera is transitioning focus between first target object 110 and second target object 120. In the initial frame 100-1 the CG camera is focused on the first target object 110, with the second target object 120 blurred. Image 100-2 shows the sixth frame in the sequence. In the sixth frame 100-2, the CG camera is already focused on the second target object 120, even though the transition of the focus should be completed by the twenty-fourth frame, 100-3. As can be seen in row 100, the focal difference, i.e., the blur, between the image 100-2 and the image 100-3 is almost identical. Consequently, the quick change in focus between images 100-1 and 100-2 results in a visual pop.

The row of images 130 shows a change in focus of the CG camera between the first target object 110 and the second target object 120 over 24 frames of video or film using the system described in this application. As can be seen in images 130-1, 130-2, 130-3, 130-4, the focus is gradually shifting from the first target object 110 to the second target object 120 over the 24 frames. In the initial frame 130-1, the first target object 110 is in focus, in the in-between frames 130-2 and 130-3, both of the target objects 110, 120 have varying degrees of blur, and in the final image 130-4, the focus has transitioned to the second target object 120. Consequently, the focal transition appears smooth in the row of images 130.

Elements 140 and 150 show a focus chart indicating the sharpness of camera's focus. Element 140 indicates the sharpness of camera's focus at the first target object 110, while element 150 indicates the sharpness of cameras focus at the second target object 120.

Figure 2:
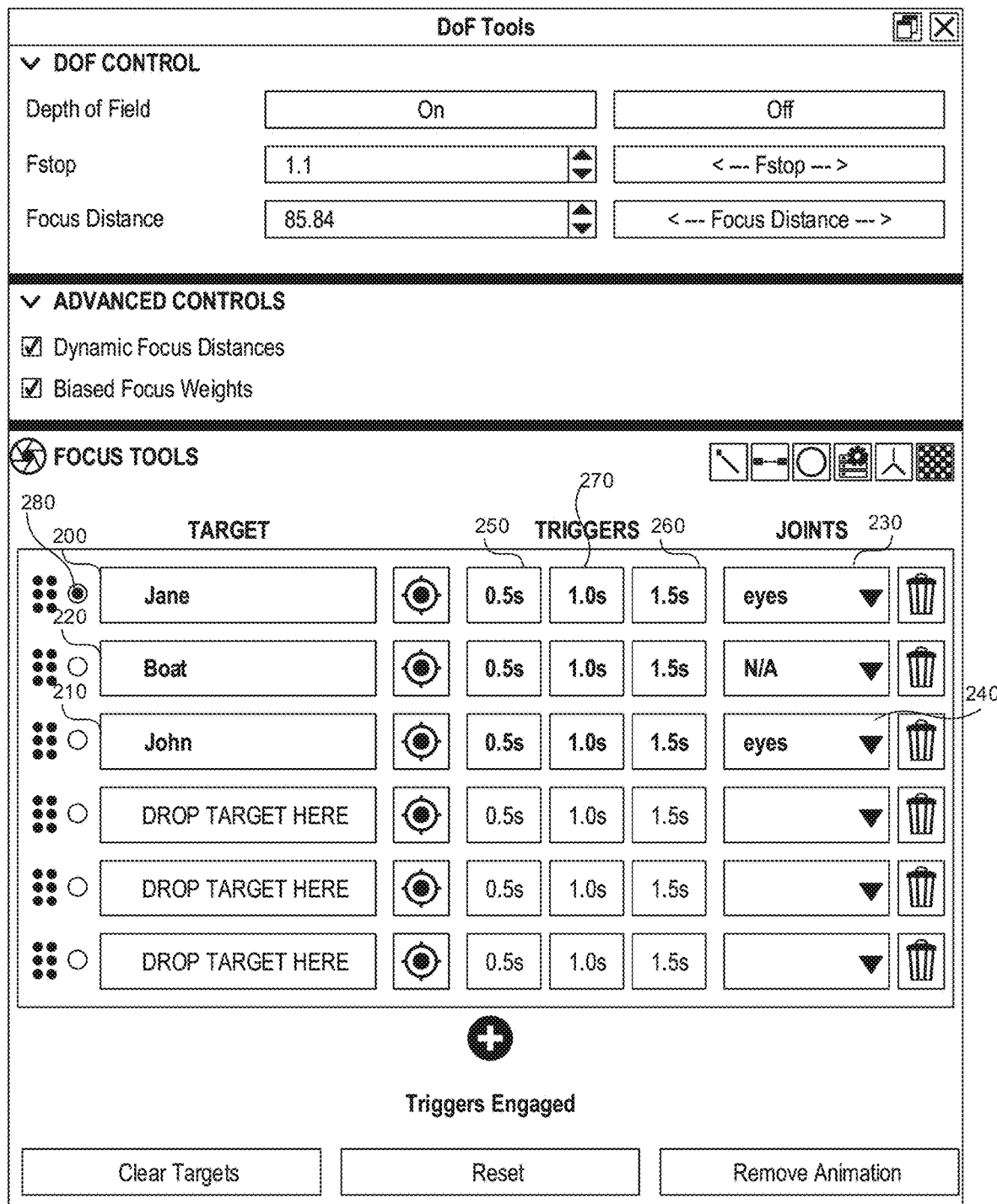
FIG. 2 shows a user interface to specify the target objects and a manner of focus transition between the target objects.

FIG. 2 shows a user interface to specify the target objects and a manner of focus transition between the target objects. User interface elements 200, 210, 220 indicate the target objects, in this case Jane, boat, and John. User interface element 280 can indicate the current target object on which a CG camera is focused.

User interface elements 230, 240 indicate a portion of the target objects 200, 210 on which a CG camera should focus. User interface elements 250, 260, 270 (only 3 labeled for brevity) indicate the manner of focus transition between the target objects. For example, the manner of focus transition can happen over half a second, 1 second, 1.5 seconds. In addition, the user interface can receive an input from the user specifying a different manner of transition, such as 2 seconds, 2.3 seconds, etc. The system can take the new target object, such as target object 210, and the manner of focus transition, and produce an animation of a smooth focus transition between the old target object 200 and the new target object 210.

Figure 3:
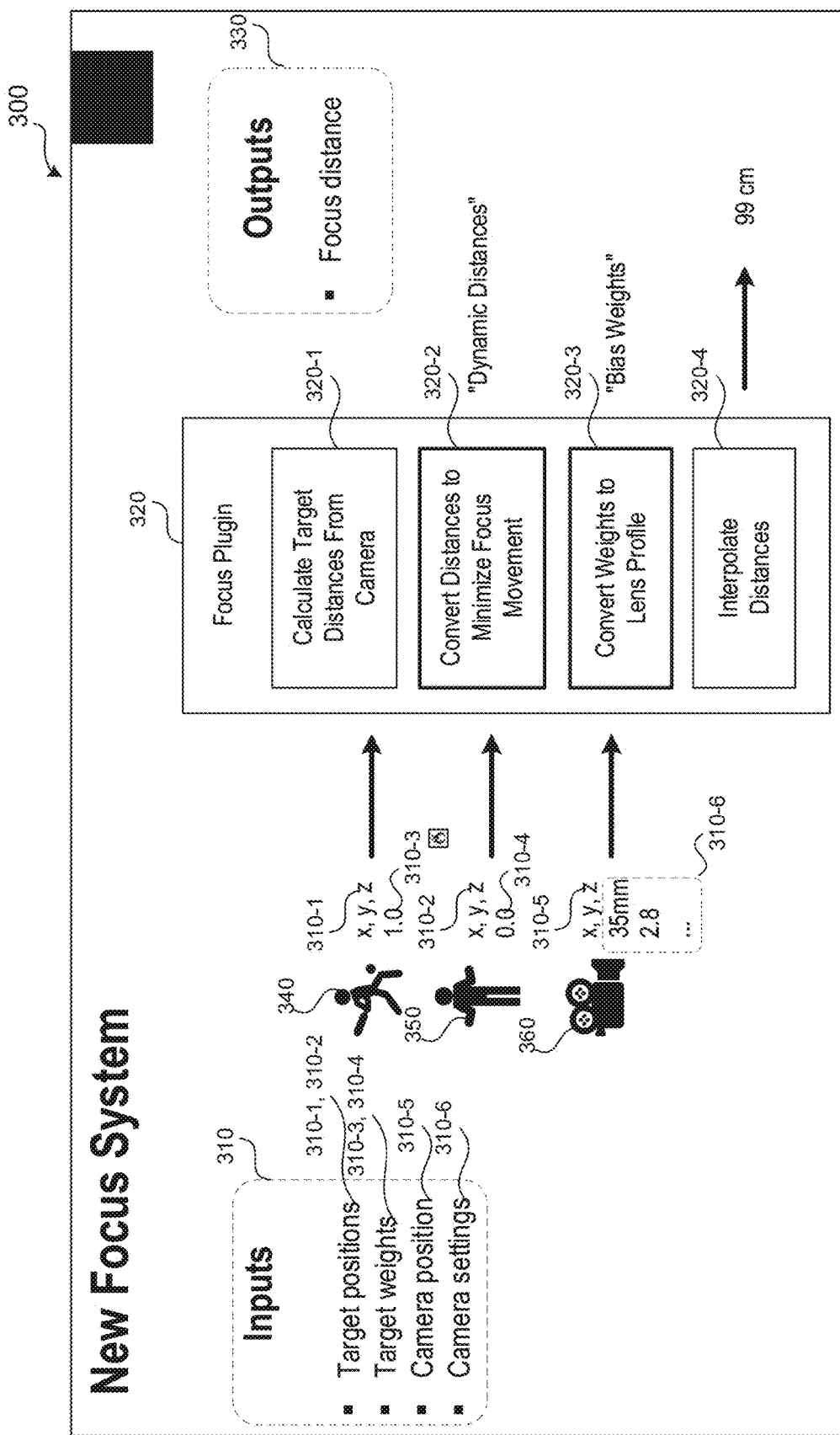
FIG. 3 shows components of the system to produce a smooth focus transition between two target objects.

FIG. 3 shows components of the system to produce a smooth focus transition between two target objects. The system 300 includes inputs 310, a module 320, and outputs 330.

The inputs 310 include target positions 310-1, 310-2, target weights 310-3, 310-4, camera position 310-5, and camera settings 310-6. The target positions 310-1, 310-2 are positions in space of the targets 340, 350. Initially, the camera 360 can be focused on the target 340, and when the focus changes finish, the camera 360 can be focused on the target 350. The target weights 310-3, 310-4 can be an indication of a manner of focus transition between the target 340 and the target 350. For example, the target weights 310-3, 310-4 can sum to one, and can indicate a linear transition of the camera focus between the target positions 310-1, 310-2, respectively. In other words, when the target weight 310-3 is 1 and the target weight 310-4 is 0, the camera 360 is focused on target position 310-1. When the target weight 310-3 is 0.5 and the target weight 310-4 is 0.5, the camera 360 is focused on the point halfway between the target positions 310-1, 310-2. When the target weight 310-3 is 0 and the target weight 310-4 is 1, the camera 360 is focused on target position 310-2. As explained in FIG. 2 above, another way to indicate the manner of focus transition between the target 340 and the target 350 is to specify the length of time over which the focus transition occurs.

The camera position 310-5 is the spatial position of camera 360. The camera settings 310-6 include a current focus point of the camera and an indication of a depth of field of the camera. The depth of field is a distance between a nearest object and a farthest object that are in focus in an image formed by the camera 360. The depth of field of the camera 360 can depend on the aperture, focal length, and distance to the target. Therefore, the indication of the depth of field of the camera 360 can include aperture, focal length, and distance to the target.

The module 320 can take the inputs 310 and can process the inputs through the submodules 320-1, 320-2, 320-3, and 320-4. The module 320 can be a standalone software or a plug-in into a software system such as Maya, Unreal, Unity, MotionBuilder, etc. The submodule 320-1 can calculate distances between the target positions 310-1, 310-2 and the camera 360. The submodule 320-2 can determine a new focus point to minimize the distance to the current focus point, as explained in FIGS. 4A-4B. The submodule 320-3 can convert the indication of the manner of focus transition between the targets 340, 350, such as target weights 310-3, 310-4 or length of time, into a nonlinear function, as explained in FIGS. 5A-5D and 6.

Finally, the submodule 320-4 can determine the focus position of the camera 360 by interpolating between the current focus point and the new focus point according to the nonlinear function. The submodule 320-4 can produce the outputs 330 indicating the position of the camera focus point and a manner in which to transition the camera focus point. For example, the outputs 330 can include the position of the camera focus point and a time at which the camera's focus should move to the focus point.

The module 320 can receive an input from a user indicating a magnitude of contribution of one or both of the submodules 320-2, 320-3. For example, the user can fully use the submodule 320-2, not use the submodule 320-2, or only partially use the submodule 320-2. The user can independently control the magnitude of contribution of either submodule 320-2 or 320-3. For example, the magnitude can vary between 0 and 1, where 0 indicates no contribution from the submodule and 1 indicates full contribution from the submodule.

In the case of the submodule 320-3, the magnitude indicates the interpolation between the nonlinear function and a linear function. For example, if the user sets the magnitude of contribution of the submodule 320-3 to 0.5, the nonlinear function can be interpolated halfway to a linear function. If the user sets the magnitude of contribution of the submodule 320-3 to 0, the nonlinear function becomes a linear function. If the user sets the magnitude of contribution of the submodule 320-3 to 1, the nonlinear function is used.

Figure 4A:
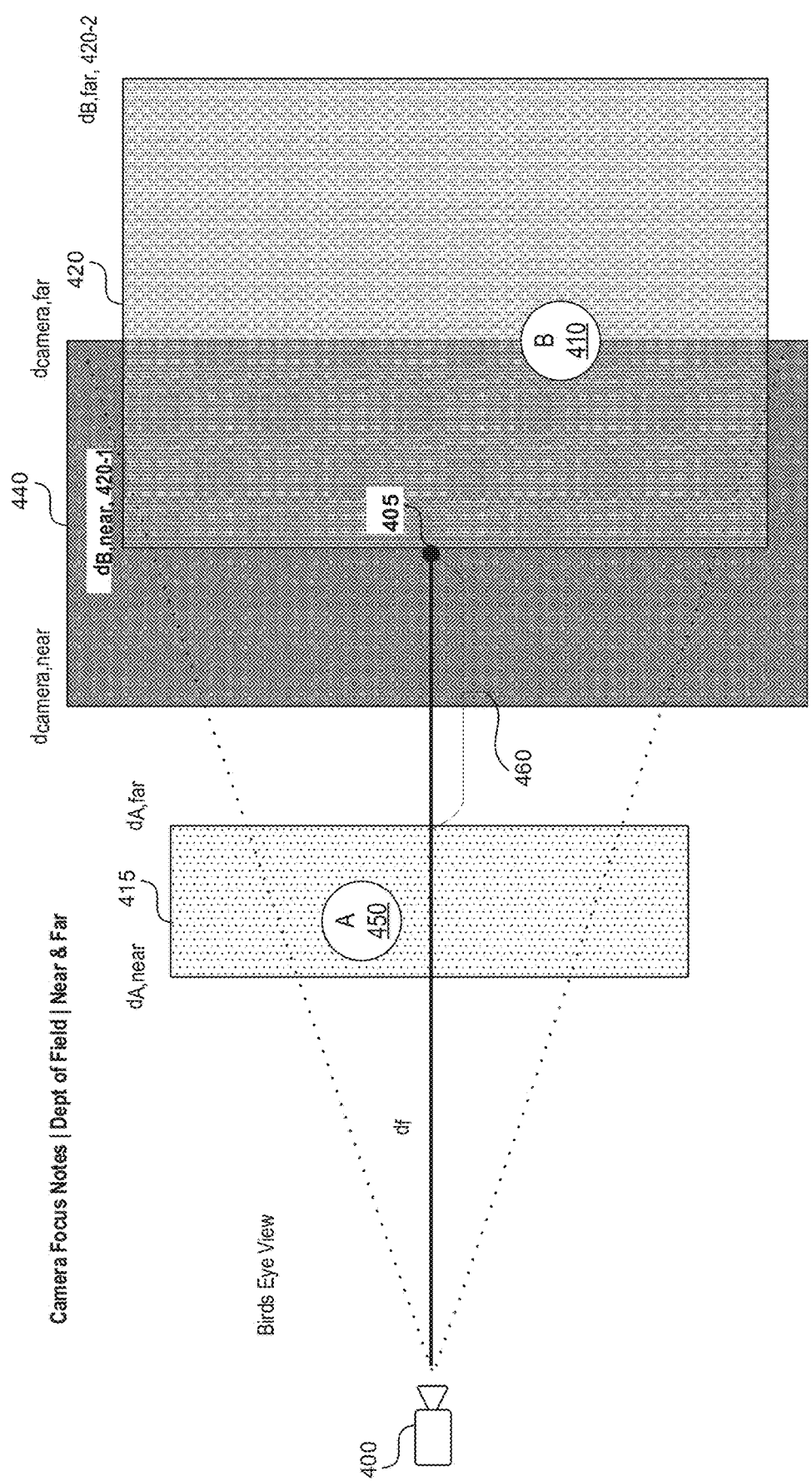
FIGS. 4A-4B show how to determine the new camera focus point.

In the case of the submodule 320-2, the magnitude indicates the size of the depth of field 415 in FIG. 4A surrounding the second target 450 in FIG. 4A. For example, if the magnitude of contribution of the submodule 320-2 is set to 1, the depth of field 415 is unchanged. If the magnitude of contribution of the submodule 320-2 is set to 0, the depth of field becomes a bounding box of the second target 450. If the magnitude of contribution of the submodule 320-2 is set to 0.5, the depth of field becomes a halfway interpolation between the depth of field 415 and the bounding box of the second target 450.

The key property of the system described in this application is that targets 340, 350 must be and must stay sharp when focused upon. During a transition from target 340 to target 350 starting at time $T_1$ and ending at time $T_2$, target 340 is not sharp after $T_1$ and target 350 is sharp no earlier than $T_2$. There is no discontinuity in focus during the transition. Additional submodules can be included in the module 320 that further modify the behavior of the focus transition by, for example, introducing focus breathing. Focus breathing refers to the shifting of either the angle of view or the focal length of a lens when changing the focus, depending on the definition. The two definitions are not equivalent: a lens with a constant focal length will exhibit narrowing of the angle of view at closer focus, and conversely, maintaining a constant angle of view requires precise shortening of the focal length as focus is decreased.

Figure 4B:
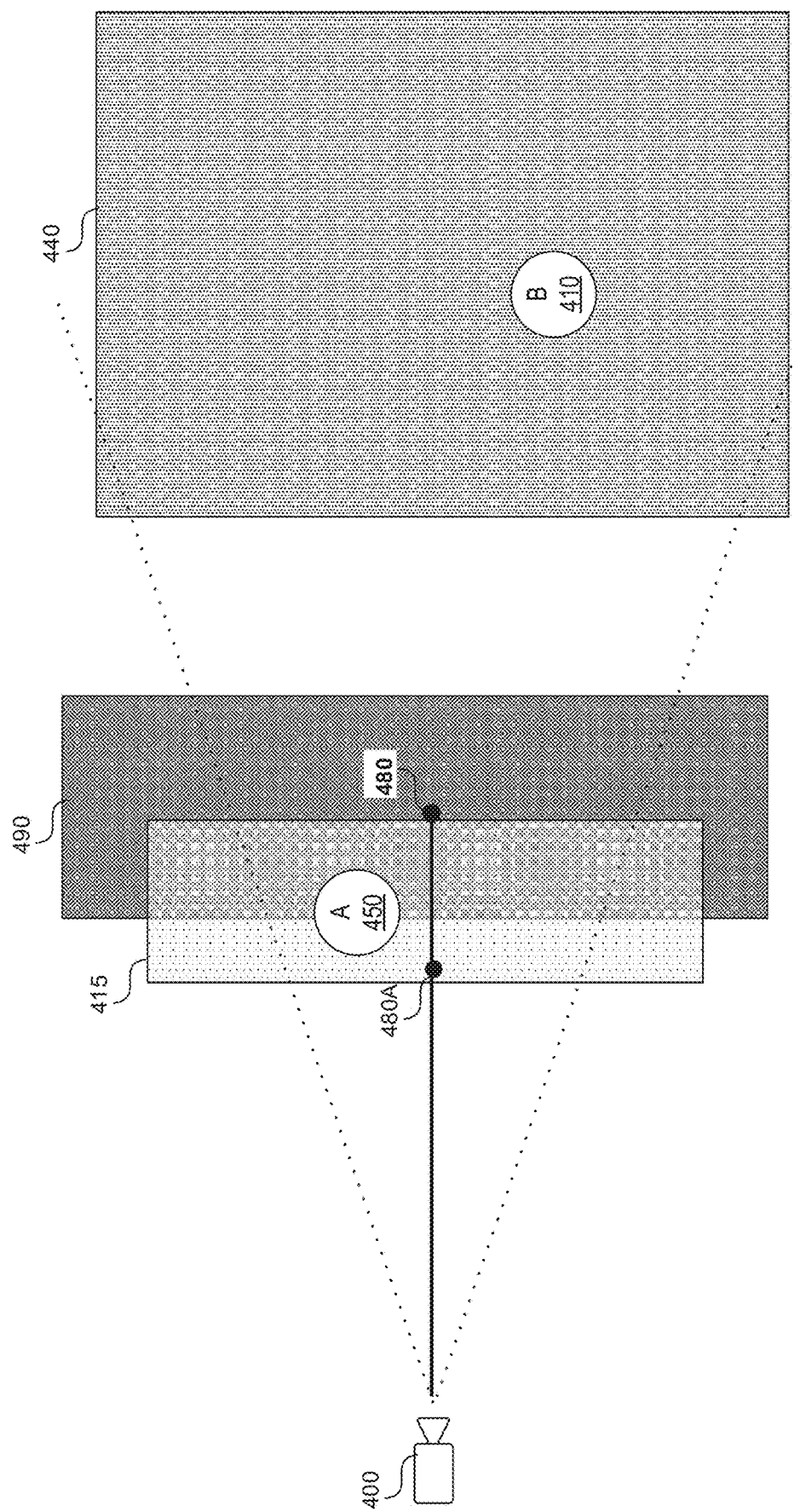
Figure 5A:
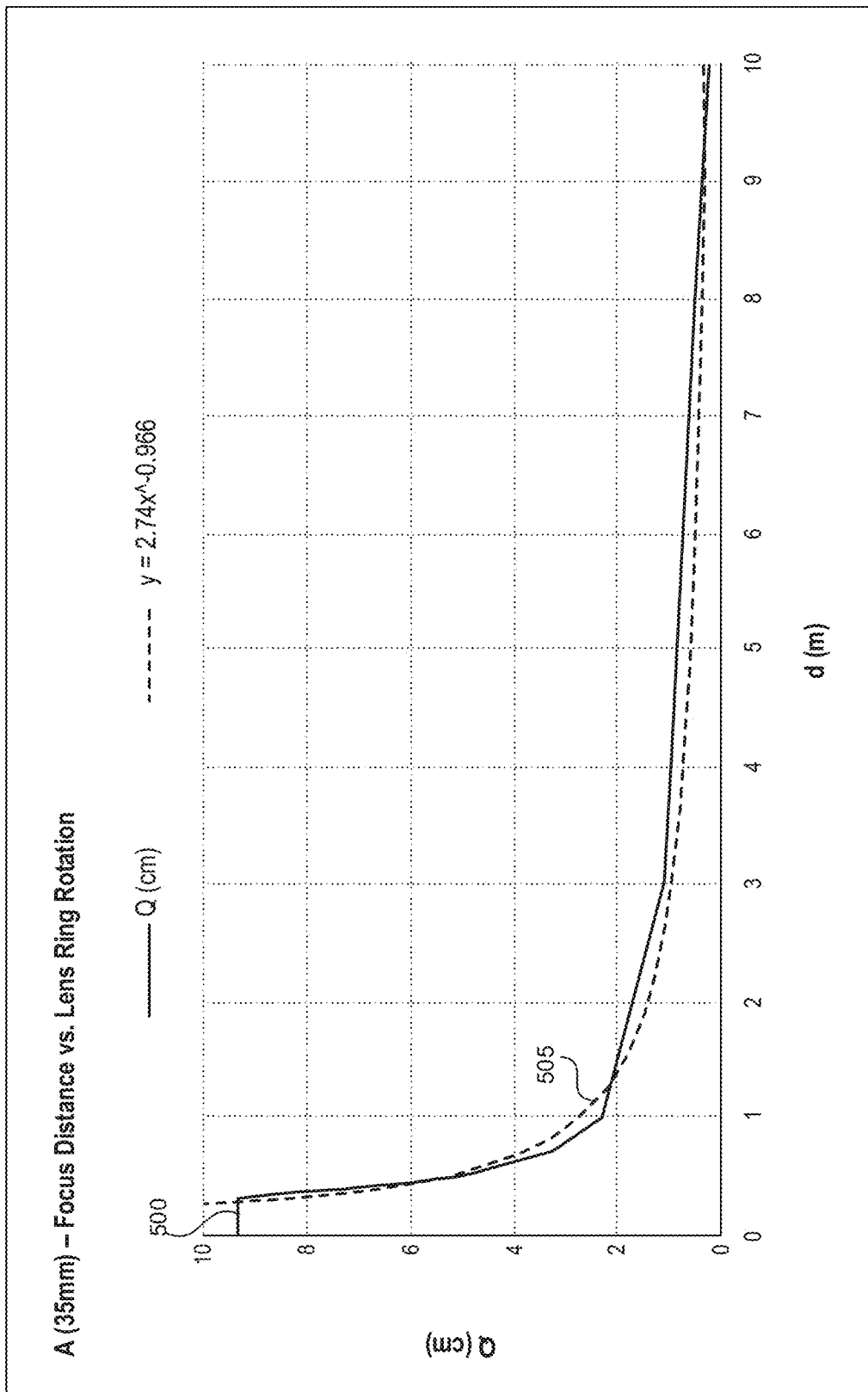
FIGS. 5A-5D show lens profiles of various lenses.
Figure 5B:
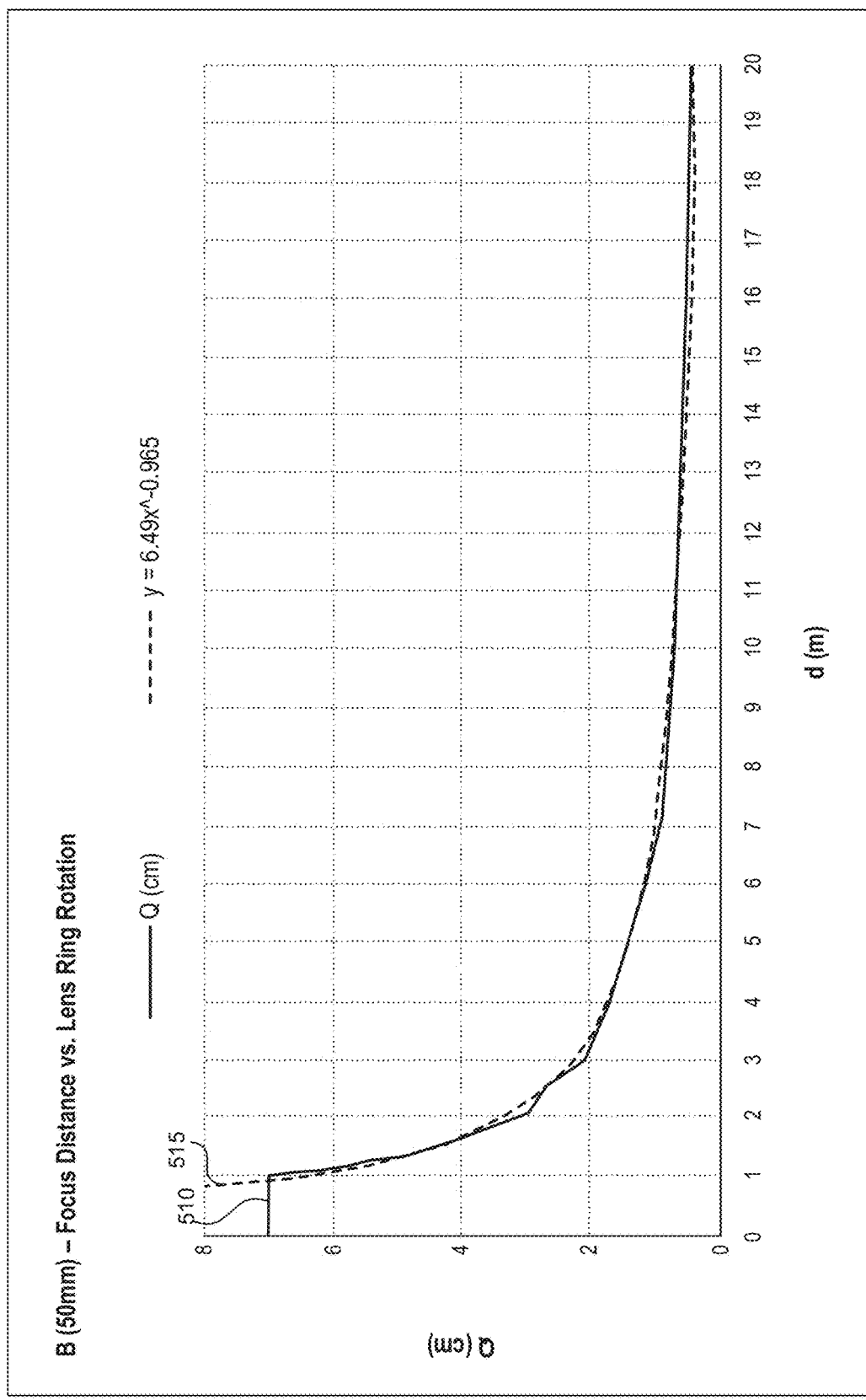
Figure 5C:
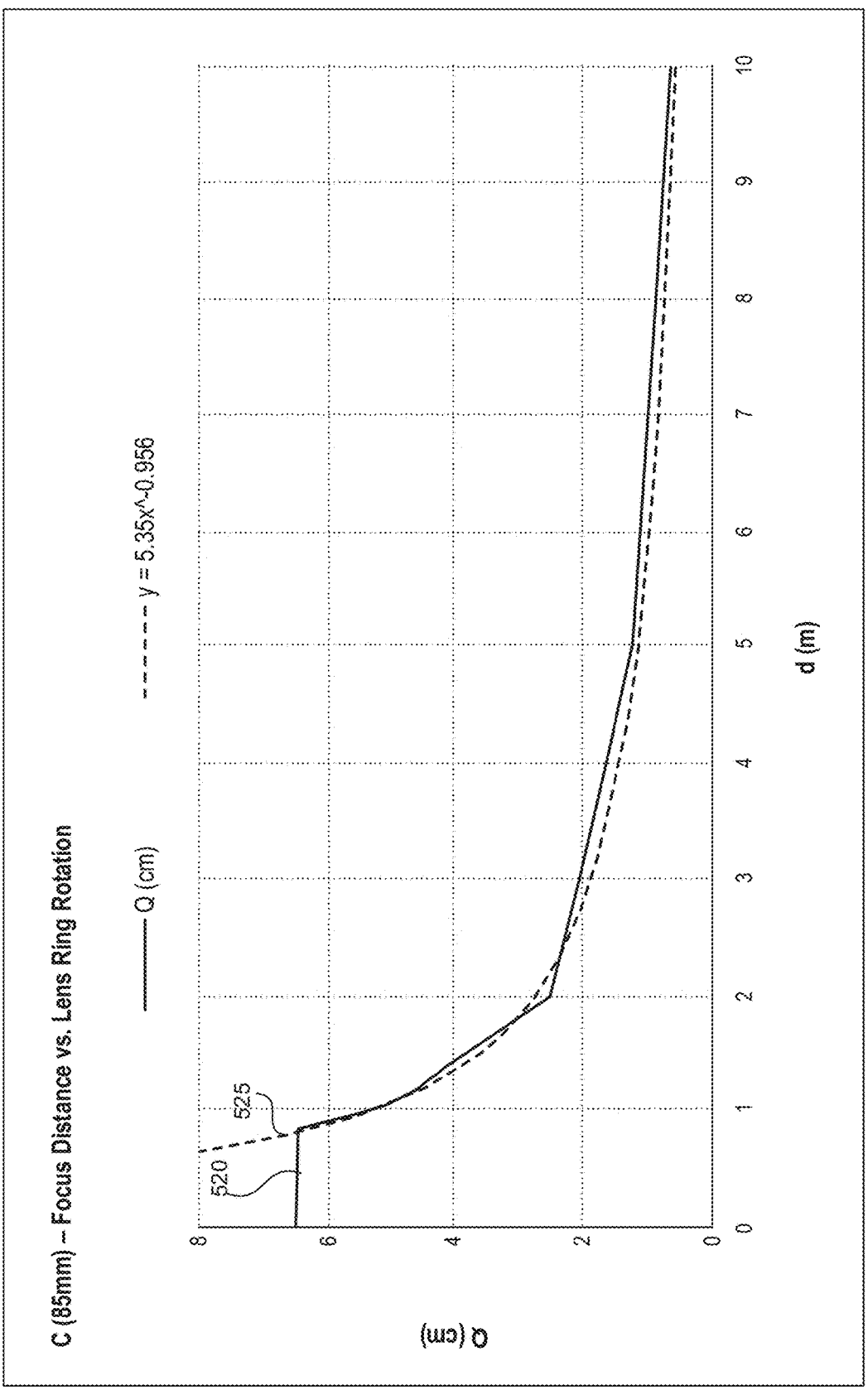
Figure 5D:
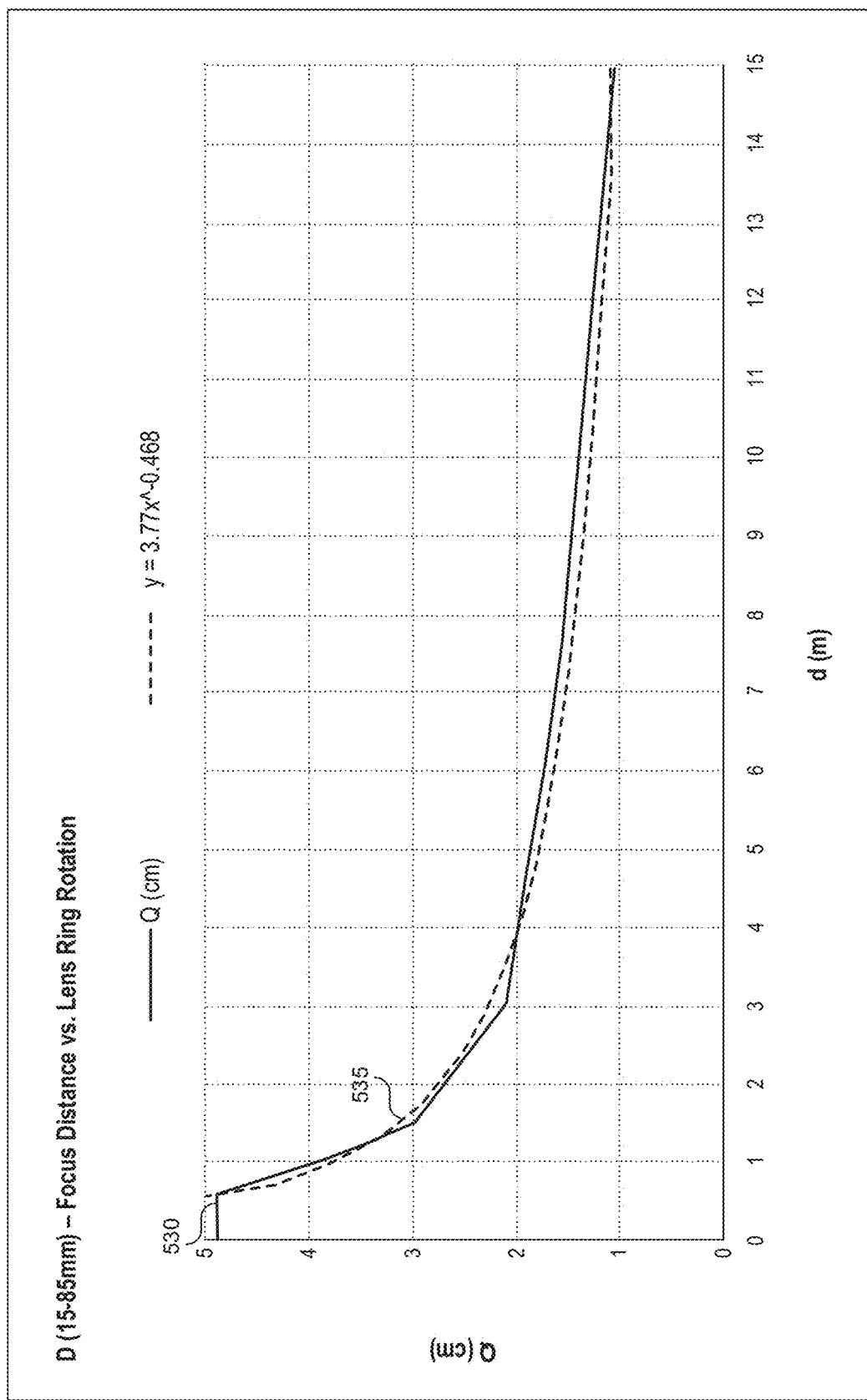

FIGS. 4A-4B show how to determine the new camera focus point. In FIG. 4A, the camera 400 is focused on target object 410. Even though the camera 400 focuses on a current focus point 405, the whole region 440 is actually in focus. In addition, the longer the distance, $d_f$ between the position of the camera 400 and the current focus point 405, the bigger the region that is actually in focus. Specifically, a depth of field 420 associated with the target object 410 is bigger than a depth of field 415 associated with the target object 450 because the target object 410 is farther away from the camera 400 and the target object 450.

For each target object 410, 450 a processor dynamically calculates the depth of field 420, 415, respectively, so that when the camera focuses anywhere within the depth of field 420, 415, the target object 410, 450 is in focus, respectively.

The target object 410 has the depth of field 420 which indicates all the points on which the camera 400 can be focused, while still keeping the target object 410 in focus. The camera focus point 405 is within the depth of field 420. The depth of field 420 can be described using two distances, a near distance 420-1 and a far distance 420-2. The camera focus point 405 also has a depth of field 440 which indicates all the points which are in focus.

The camera 400 needs to transition the focus to the target object 450. To transition the focus to the target object 450, a hardware or a software processor executing instructions described in this application can compute the substantially smallest distance 460 the camera focus point 405 needs to travel to put the target object 450 in focus. To compute the substantially smallest distance 460, the processor can determine the depth of field 415 around the target object 450 and compute the substantially closest point 480 within the depth of field 415 to the current camera focus point 405. As seen in FIG. 4B, when the current camera focus point 405 transitions to the camera focus point 480, target object 450 is in focus and within the camera depth of field 490, while the initial target object 410 is not in focus.

The labels in FIGS. 4A-4B and some additional labels are explained below. Specifically:
hfd is Hyperfocal distance
dnear is Near distance
dfar is Far distance
f is Focal length
a is Aperture
c is Circle of confusion
d is Distance to target
df is Camera's focus distance
dA is Distance from camera to target A
dA,near is Closest focus distance that keeps target A in focus
dA,far is Farthest focus distance that keeps target A in focus.
Further, the relationship between above variables is defined as:
hfd=f+(f*f)/(a*c)
dnear=d*(hfd−f)/(hfd+(d−2*f))
dfar=d*(hfd−f)/(hfd−d).
To get new $d_f$ take the sum of:

Closest to df (dA, dA,near, dA,far)*weight
Closest to df (dB, dB,near, dB,far)*weight.

The system minimizes focus point movement, resulting in smoother focus pull. In one example, the calculation of the focus point is may not be inter-frame dependent and does not require additional triggers/inputs about focus direction. The system is easily extensible. For example, the target weights 310-3, 310-4 in FIG. 3 can be changed to be nonlinear. The submodules 320-2 and 320-3 in FIG. 3 can be easily and independently disabled.

The substantially closest point 480 within the depth of field 415 can be any point of 90% of the points closest to the current focus point 405. For example, the substantially closest point 480A can be behind the target object 450, thus causing the camera to overshoot the target object 450, and then settle the focus on the target object 450. The overshooting of focus and refocusing on the target object 450 can create a desirable artistic effect.

FIGS. 5A-5D show lens profiles of various lenses. The graphs 500, 510, 520, 530 show the physical lens profiles of various lenses. As can be seen in FIGS. 5A-5D the physical lens profiles are not linear. The graphs 500, 510, 520, 530 show the focus distance on the X axis versus the lens ring rotation on the Y axis. The graphs 505, 515, 525, 535 are nonlinear functions approximating the graphs 500, 510, 520, 530. As can be seen in FIGS. 5A-5D, the graphs 500, 510, 520, 530, when the lens ring rotation is 0, small changes to the lens ring rotation cause large changes in the focus distance. When the lens rotation is greater than 2, large changes to the lens ring rotation cause small changes in the focus distance.

The nonlinear functions 505, 515, 525 show that the lens ring rotation is inversely proportional to the distance. The nonlinear function 535 shows that the lens ring rotation is inversely proportional to the square root of the distance. As can be seen, the lens profiles vary based on the lens type.

Figure 6:
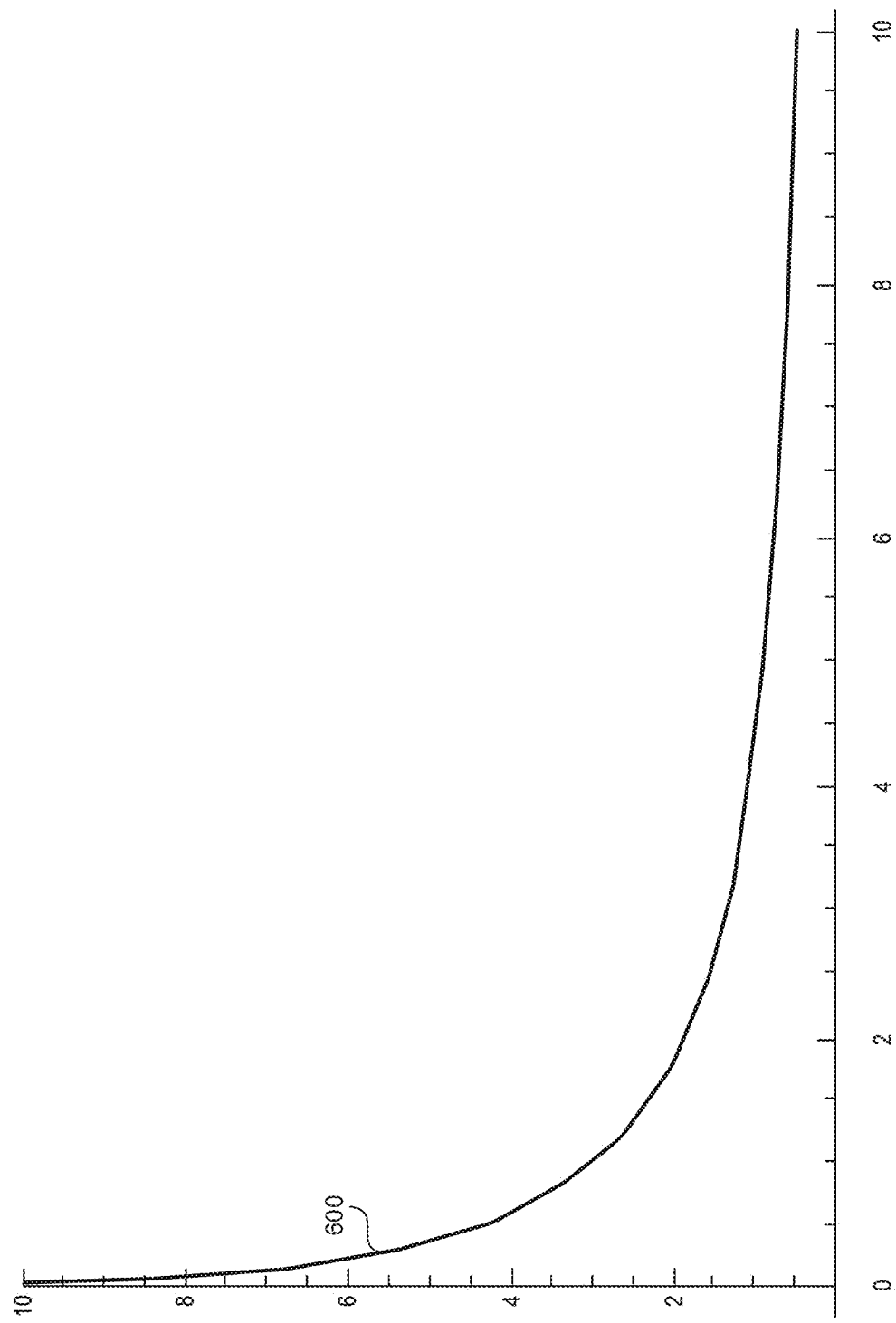
FIG. 6 shows the nonlinear function that is an average of various lens profiles.

FIG. 6 shows the nonlinear function that is an average of various lens profiles. The nonlinear function 600 can be represented using the formula:

$$Q = \left(1 - \sqrt{1 - \frac{1}{(1+d)}}\right) * 10,$$

where Q is the lens ring rotation distance and d is the focus distance in meters. A processor can receive an indication of the lens type from a camera, or from a user. For example, if a CG camera needs to match the real camera, once a lens is mounted on the real camera, the lens can automatically communicate the type of lens to the CG camera. Based on the type of lens, the processor can determine the appropriate nonlinear function 505, 515, 525, 535 in FIGS. 5A-5D.

In one example, based on the indication of the lens type, the processor can select the appropriate nonlinear function 505, 515, 525, 535 in FIGS. 5A-5D, 600 that best matches the camera lens. In another example, the processor can automatically fit the appropriate nonlinear function to the lens profile 500, 510, 520, 530. If no lens type is indicated, the processor can select the nonlinear function 600 that represents an average of the various lens profiles.

In addition, the lens profile 500, 510, 520, 530 can be represented using a machine learning/artificial intelligence model (AI). In some cases, the lens profile 500, 510, 520, 530 cannot be modeled using the nonlinear function 505, 515, 525, 535, and AI can be used to determine the manner of focus transition based on the lens profile 500, 510, 520, 530. Further, the lens profile 500, 510, 520, 530 can change based on the distance between the camera and the target object. Instead of using the same nonlinear function 505, 515, 525, 535 for various distances between the camera and the target object, the AI can determine the manner of focus transition based on the distance between the camera and the target object.

Further, the AI can anticipate a motion of a target object, and even before the target object moves, the focus puller can begin the focus transition to the anticipated new position of the target object.

Figure 7:
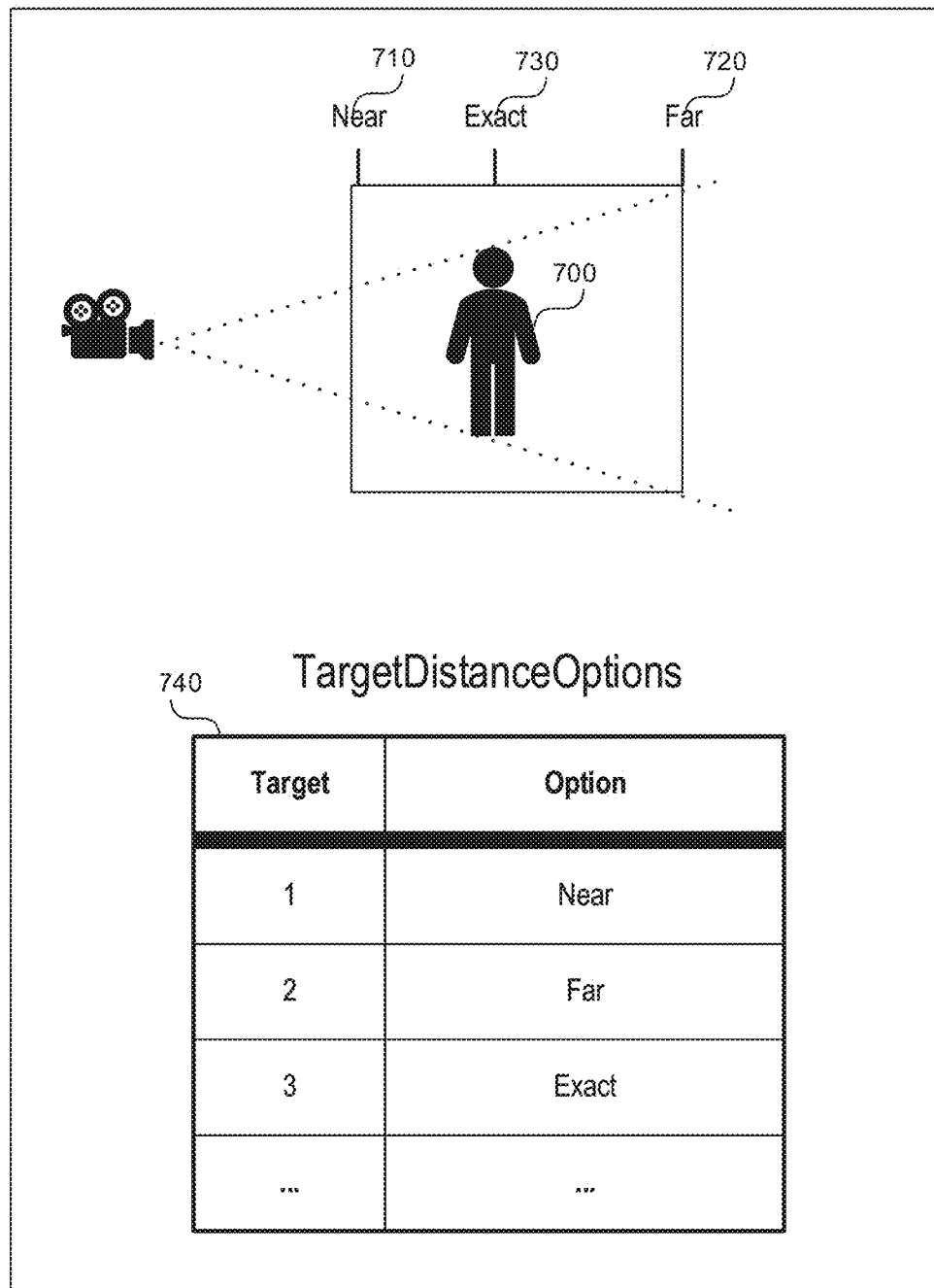
FIG. 7 shows a data structure used to determine the new camera focus point.

FIG. 7 shows a data structure used to determine the new camera focus point. For each target object 700 among multiple target objects, a processor can create a first distance 710, a second distance 720, and an exact distance 730, based on the position of the camera, the position of the object, and camera settings such as depth of field.

The first distance 710 and the second distance 720 indicate a depth of field associated with the target object 700, that is a region within which the focus point of the camera can lie and have the target object 700 in focus. The exact distance 730 indicates a distance between the current focus point of the CG camera and the target object 700.

The processor can update which of the first distance 710, the second distance 720, and the exact distance 730 are closest to the current focus point of the camera. For example, the processor can rank the distances 710, 720, 730 as shown in column 740, where rank of 1 indicates that the first distance 710 is the closest to the current focus point of the camera.

Figure 8:
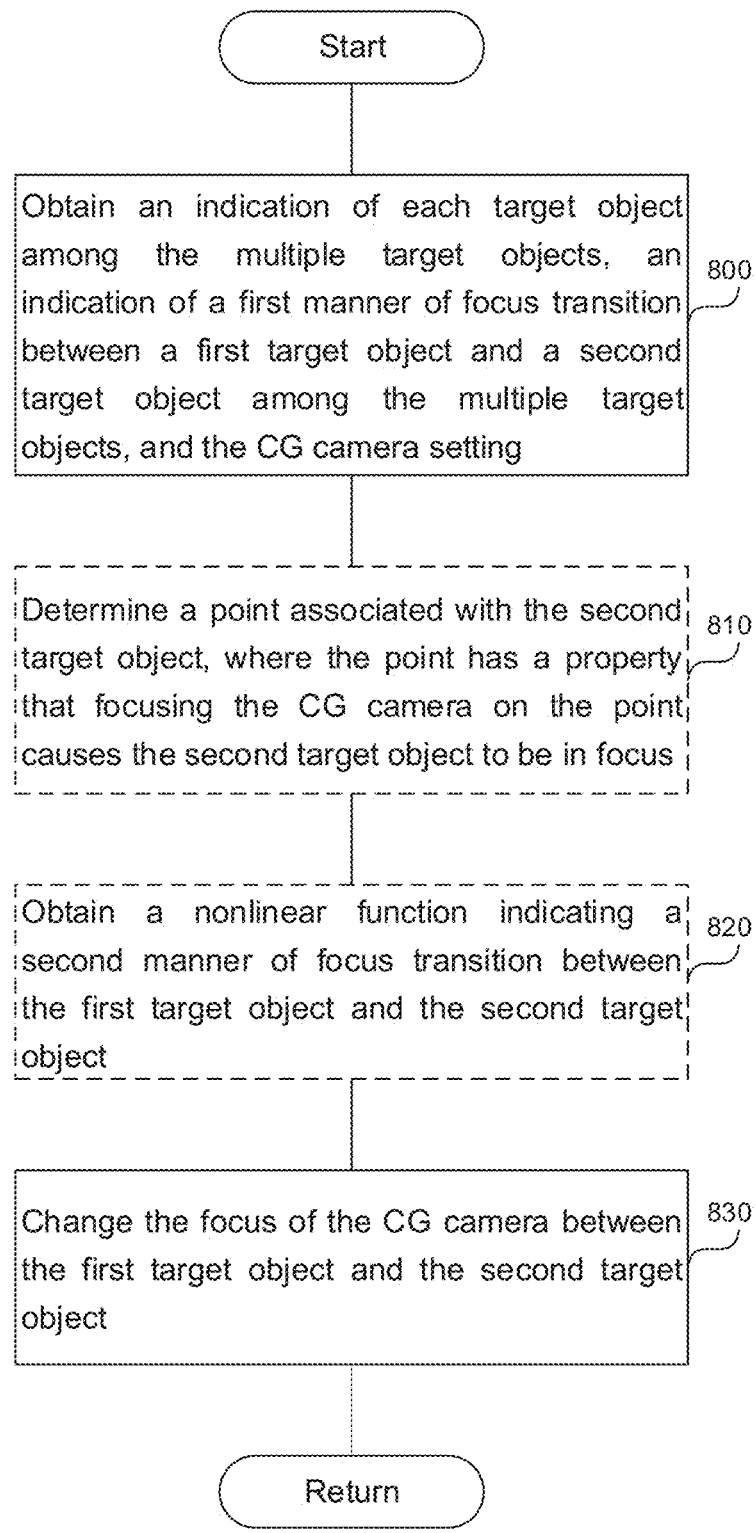
FIG. 8 is a flowchart of a method to smoothly change a focus of a camera between multiple target objects.

FIG. 8 is a flowchart of a method to smoothly change a focus of a camera between multiple target objects. The camera can be a CG camera or can be a physical camera. In step 800, a processor can obtain an indication of each target object among the multiple target objects, an indication of a first manner of focus transition between a first target object and a second target object among the multiple target objects, and the CG camera setting. The manner of focus transition can be a speed of focus transition and can be indicated in various ways such as by a length of time to transition between two targets, by linear weights indicating the focus position of the camera, by a curve indicating the position of the camera, etc. The CG camera is configured to transition the focus from the first target object to the second target object. The CG camera setting can include a current focus point of the CG camera, a region of acceptable focus, position of the camera, aperture of the camera, etc. The region of acceptable focus can be an indication of a depth of field of the camera.

In step 810, the processor can determine a point associated with the second target object, where the point has a property that focusing the CG camera on the point causes the second target object to be in focus. The point associated with the second target object is closer to the current focus point of the CG camera than a substantial portion of other points having the property. For example, the point can be the closest point to the current focus point. In another example, the point can be closer to the current focus point than 50% of the points having the property. In another example, the point can be closer to the current focus point than 10% of the points having the property.

To determine the point associated with the second target object, the processor can determine a depth of field associated with the second target object. The depth of field is a region between a nearest object and a farthest object that are in focus in an image formed by the CG camera. The depth of field indicates a near distance to the CG camera and a far distance to the CG camera. When a focus point of the CG camera is between the near distance and the far distance, an object located between the near distance and the far distance is in focus. The processor can determine the point between the near distance and the far distance substantially closest to the current focus point of the CG camera. Substantially closest can include points that are closer to the current focus point than 10% of the points within the depth of field.

In step 820, the processor can obtain a nonlinear function indicating a second manner of focus transition between the first target object and the second target object, as described in FIGS. 5A-5D and 6. The nonlinear function can include one or more nonlinear functions describing the manner of focus transition. For example, the nonlinear function can model a physical lens as shown in FIGS. 5A-5D. The nonlinear function can include an indication of an animation associated with the second manner of focus transition between the first target object and the second target object. For example, the nonlinear function can include a time dependent curve indicating speed of focus transition. The nonlinear functions can be preset. The processor can present the user with an option of one or more nonlinear functions to select. For example, the preset nonlinear functions can include an abrupt focus transition, smooth focus transition, focus transition to overshoot the target and pulled back to focus on the target, etc. Various nonlinear functions can be combined with each other.

The processor can adjust a magnitude of influence of steps 810 and 820 based on, for example, user input, as described in relation to submodules 320-2, 320-3 in FIG. 3, and as described below. For example, effectively, the processor can avoid performing the step 810 and/or step 820.

In step 830, the processor can change the focus of the CG camera between the first target object and the second target object by changing the focus of the CG camera from the current focus point to the point substantially closest to the current focus point ("point") based on the nonlinear function.

To ensure the chosen distance option remains consistent during focus transition, the processor can maintain a data structure associated with each target object. For each target object that is not being focused to or focused away from, the processor can create the data structure containing a first distance, a second distance, and an exact distance, where the first distance and the second distance indicate region within which a focus point of the CG camera can lie and have each target object in focus, for example, the depth of field. The calculation of the first, second, and exact distances is based on the position of the camera, the position of the object, and camera settings such as depth of field. The exact distance indicates a distance between the current focus point of the CG camera and each target object. The values need to be continually recalculated because the camera and targets are moving. The processor can update which of the first distance, the second distance, and the exact distance is closest to the current focus point of the CG camera. Subsequently, if the camera focus is shifting to a new target object, the processor can simply determine the new camera focus point by retrieving the closest point among the first, second, and exact distances from the data structure.

To determine the nonlinear function to use, the processor can obtain an indication of a physical camera lens. The processor can retrieve the nonlinear function representing focus behavior of the physical camera lens from a database. The processor can use the nonlinear function to change the focus of the CG camera.

The processor can adjust the magnitude of contribution of the point to the manner of focus transition as described in relation to the submodule 320-2 in FIG. 3. The processor can receive an input indicating a magnitude of contribution of the point. The magnitude can indicate to fully use the point, to not use the point, or to partially use the point. The processor can change the focus of the CG camera between the first target object and the second target object by changing the focus of the CG camera from the current focus point to the point associated with the second target object, based on the nonlinear function and the magnitude, as described in FIG. 3 in relation to the submodule 320-2.

The processor can adjust the magnitude of contribution of the nonlinear function to the manner of focus transition, as described in relation to the submodule 320-3 in FIG. 3. The processor can receive a user input indicating a magnitude of contribution of the nonlinear function. The magnitude can indicate to fully use the nonlinear function, to not use the nonlinear function, or to partially use the nonlinear function. The processor can change the focus of the CG camera between the first target object and the second target object by changing the focus of the CG camera from the current focus point to the point associated with the second target object based on the magnitude of contribution of the nonlinear function.

To model the manner of focus transition of a physical lens, the processor can obtain the nonlinear function substantially inversely proportional to a distance between the CG camera and the current focus point and indicating the second manner of focus transition between the first target object and the second target object. Alternatively, the processor can obtain the nonlinear function inversely proportional to a square root of the distance between the CG camera and the current focus point and indicating the second manner of focus transition between the first target object and the second target object.

Visual Content Generation System

Figure 9:
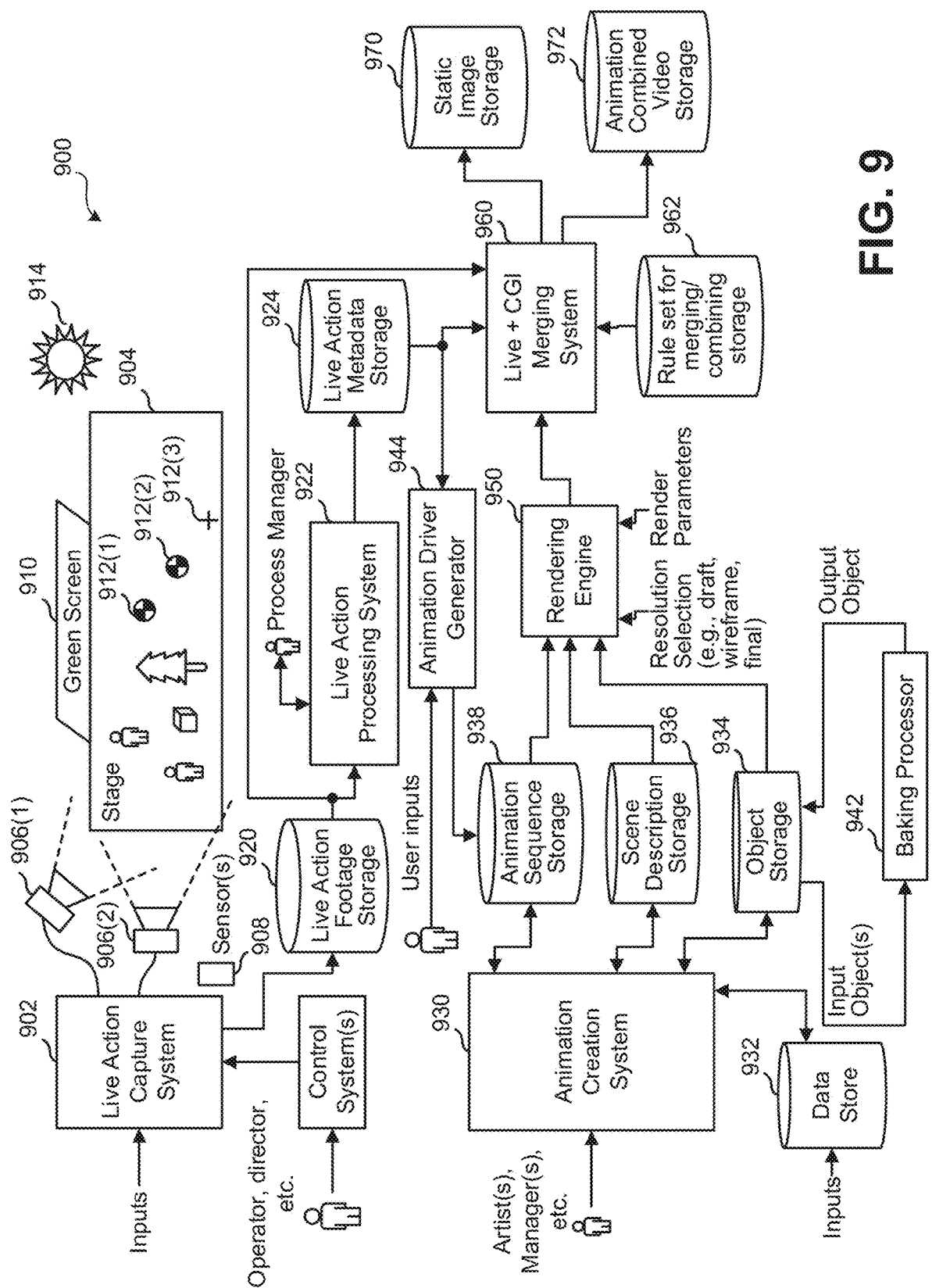
FIG. 9 illustrates an example visual content generation system 900 as might be used to generate imagery in the form of still images and/or video sequences of images.

FIG. 9 illustrates an example visual content generation system 900 as might be used to generate imagery in the form of still images and/or video sequences of images. Visual content generation system 900 might generate imagery of live action scenes, computer-generated scenes, or a combination thereof. In a practical system, users are provided with tools that allow them to specify, at high levels and low levels where necessary, what is to go into that imagery. For example, a user might be an animation artist and might use visual content generation system 900 to capture interaction between two human actors performing live on a sound stage, replace one of the human actors with a computer-generated anthropomorphic non-human being that behaves in ways that mimic the replaced human actor's movements and mannerisms, and then add in a computer-generated third character and background scene elements, all in order to tell a desired story or generate desired imagery.

Still images that are output by visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might or might not include color values, and might include depth values, alpha values, weight values, object identifiers, or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-size objects).

Creating video sequences for storytelling or other purposes often calls for scenes that cannot be created with live actors, such as a talking tree, an anthropomorphic object, space battles, and the like. Such video sequences might be generated computationally rather than capturing right from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 9, a live action capture system 902 captures a live scene that plays out on a stage 904. Live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On stage 904, there might be human actors, animal actors, inanimate objects, background objects, and possibly an object such as a green screen 910 that is designed to be captured in a live scene recording in such a way that it is easily overlaid with computer-generated imagery. Stage 904 might also contain objects that serve as fiducials, such as fiducials 912(1)-(3), that might be used post-capture to determine where an object was during capture. A live action scene might be illuminated by one or more lights, such as an overhead light 914.

During or following the capture of a live action scene, live action capture system 902 might output live action footage to a live action footage storage 920. A live action processing system 922 might process live action footage to generate data about that live action footage and store that data into a live action metadata storage 924. Live action processing system 922 might include computer processing capabilities, image processing capabilities, one or more processors, program code storage for storing program instructions executable by the one or more processors, as well as user input devices and user output devices, not all of which are shown. Live action processing system 922 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 914, as that might be useful in post-processing to match computer-generated lighting on objects that are computer-generated and overlaid on the live action footage. Live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of visual content generation system 900. Animation creation system 930 might include computer processing capabilities, image processing capabilities, one or more processors, program code storage for storing program instructions executable by the one or more processors, as well as user input devices and user output devices, not all of which are shown. Animation creation system 930 might be used by animation artists, managers, and others to specify details, perhaps programmatically and/or interactively, of imagery to be generated. From user input and data from a database or other data source, indicated as a data store 932, animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render computer-generated imagery (CGI). For example, scene data might include the locations of several articulated characters, background objects, lighting, etc., specified in a two-dimensional space, three-dimensional space, or other dimensional space (such as a 2.5-dimensional space, three-quarter dimensions, pseudo-3D spaces, etc.) along with locations of a camera viewpoint and view plane from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 930 might be interactive, allowing a user to read in animation sequences, scene descriptions, object details, etc., and edit those, possibly returning them to storage to update or replace existing data. As an example, an operator might read in objects from object storage into a baking processor 942 that would transform those objects into simpler forms and return those to object storage 934 as new or different objects. For example, an operator might read in an object that has dozens of specified parameters (movable joints, color options, textures, etc.), select some values for those parameters, and then save a baked object that is a simplified object with now fixed values for those parameters.

Rather than requiring user specification of each detail of a scene, data from data store 932 might be used to drive object presentation. For example, if an artist is creating an animation of a spaceship passing over the surface of the Earth, instead of manually drawing or specifying a coastline, the artist might specify that animation creation system 930 is to read data from data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time $T_1$ to $T_2$," at a lower level (e.g., "move the elbow joint 2.5 degrees per frame"), or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene. Animation driver generator 944 might generate corresponding animation parameters to be stored in animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 922. Animation driver generator 944 might convert that movement data into specifications of how joints of an articulated CGI character are to move over time.

Rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 950 might include computer processing capabilities, image processing capabilities, one or more processors, program code storage for storing program instructions executable by the one or more processors, as well as user input devices and user output devices, not all of which are shown.

Visual content generation system 900 can also include a merging system 960 that merges live footage with animated content. The live footage might be obtained and input by reading from live action footage storage 920 to obtain live action footage, by reading from live action metadata storage 924 to obtain details such as presumed segmentation in captured images segmenting objects in a live action scene from their background (perhaps aided by the fact that green screen 910 was part of the live action scene), and by obtaining CGI imagery from rendering engine 950.

Merging system 960 might also read data from rule sets for merging/combining storage 962. A very simple example of a rule in a rule set might be "obtain a full image including a two-dimensional pixel array from live footage, obtain a full image including a two-dimensional pixel array from rendering engine 950, and output an image where each pixel is a corresponding pixel from rendering engine 950 when the corresponding pixel in the live footage is a specific color of green, otherwise output a pixel value from the corresponding pixel in the live footage."

Merging system 960 might include computer processing capabilities, image processing capabilities, one or more processors, program code storage for storing program instructions executable by the one or more processors, as well as user input devices and user output devices, not all of which are shown. Merging system 960 might operate autonomously, following programming instructions, or might have a user interface or programmatic interface over which an operator can control a merging process. In some embodiments, an operator can specify parameter values to use in a merging process and/or might specify specific tweaks to be made to an output of merging system 960, such as modifying boundaries of segmented objects, inserting blurs to smooth out imperfections, or adding other effects. Based on its inputs, merging system 960 can output an image to be stored in a static image storage 970 and/or a sequence of images in the form of video to be stored in an animated/combined video storage 972.

Thus, as described, visual content generation system 900 can be used to generate video that combines live action with computer-generated animation using various components and tools, some of which are described in more detail herein. While visual content generation system 900 might be useful for such combinations, with suitable settings, it can be used for outputting entirely live action footage or entirely CGI sequences. The code may also be provided and/or carried by a transitory computer-readable medium, e.g., a transmission medium such as in the form of a signal transmitted over a network.

According to one embodiment, the techniques described herein are implemented by one or more generalized computer systems programmed to perform the techniques pursuant to program instructions in firmware, memory, other storage, or a combination. Special-purpose computing devices may be used, such as desktop computer systems, portable computer systems, handheld devices, networking devices, or any other device that incorporates hardwired and/or program logic to implement the techniques.

One embodiment might include a carrier medium carrying image data or other data having details generated using the methods described herein. The carrier medium can comprise any medium suitable for carrying the image data or other data, including a storage medium, e.g., solid-state memory, an optical disk, or a magnetic disk, or a transient medium, e.g., a signal carrying the image data such as a signal transmitted over a network, a digital signal, a radio frequency signal, an acoustic signal, an optical signal, or an electrical signal.

Computer System

Figure 10:
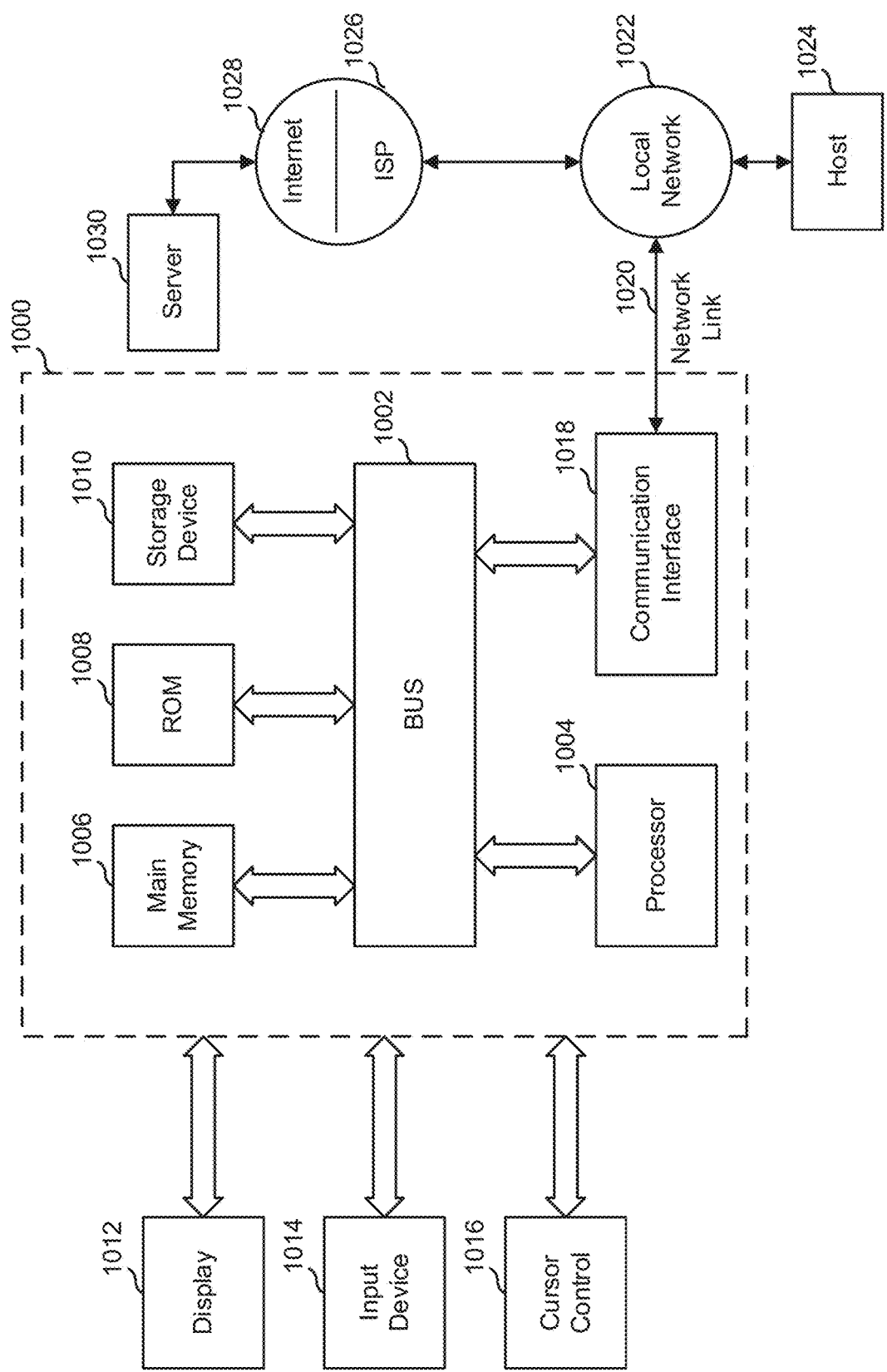
FIG. 10 is a block diagram that illustrates a computer system 1000 upon which the computer systems of the systems described herein and/or visual content generation system 900 (see FIG. 9) may be implemented.

FIG. 10 is a block diagram that illustrates a computer system 1000 upon which the computer systems of the systems described herein and/or visual content generation system 900 (see FIG. 9) may be implemented. Computer system 1000 includes a bus 1002 or other communication mechanism for communicating information, and a processor 1004 coupled with bus 1002 for processing information. Processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 may also be used for storing temporary variables or other intermediate information during execution of instructions to be executed by processor 1004. Such instructions, when stored in nontransitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a computer monitor, for displaying information to a computer user. An input device 1014, including alphanumeric and other keys, is coupled to bus 1002 for communicating information and command selections to processor 1004. Another type of user input device is a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), allowing the device to specify positions in a plane.

Computer system 1000 may implement the techniques described herein using customized hardwired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any nontransitory media that store data and/or instructions that cause a machine to operate in a specific fashion. Such storage media may include nonvolatile media and/or volatile media. Nonvolatile media includes, for example, optical or magnetic disks, such as storage device 1010. Volatile media includes dynamic memory, such as main memory 1006. Common forms of storage media include, for example, a floppy disk, a flexible disk, a hard disk, a solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1002. Transmission media can also take the form of acoustic or light waves, such as those generated during radio-wave and infrared data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a network connection. A modem or network interface local to computer system 1000 can receive the data. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be a network card, a modem, a cable modem, or a satellite modem to provide a data communication connection to a corresponding type of telephone line or communications line. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020, and communication interface 1018. In the Internet example, a server 1030 might transmit a requested code for an application program through the Internet 1028, ISP 1026, local network 1022, and communication interface 1018. The received code may be executed by processor 1004 as it is received, and/or stored in storage device 1010 or other nonvolatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be nontransitory. The code may also be provided carried by a transitory computer-readable medium, e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or subcombinations of the above-disclosed invention can be advantageously made. The example arrangements of components are shown for purposes of illustration and combinations, additions, rearrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method to change a focus of a computer graphics (CG) camera between multiple target objects, the method comprising:
   obtaining an indication of a first target object and a second target object among the multiple target objects, and the CG camera settings,
      wherein the CG camera is configured to transition the focus from the first target object to the second target object,
      wherein the CG camera settings include a current focus point of the CG camera;
   obtaining a nonlinear function indicating a manner of focus transition between the first target object and the second target object; and
   changing the focus of the CG camera between the first target object and the second target object based on the nonlinear function.

2. The method of claim 1, comprising:
   determining a point associated with the second target object,
      wherein the point has a property that focusing the CG camera on the point causes the second target object to be in focus,
      wherein the point associated with the second target object is closer to the current focus point of the CG camera than a substantial portion of other points having the property.

3. The method of claim 2, comprising determining the point associated with the second target object including:
   determining a region of acceptable focus associated with the second target object,
      wherein the region of acceptable focus is a region between a nearest object and a farthest object that are in focus in an image formed by the CG camera,
      wherein the region of acceptable focus indicates a near distance to the CG camera and a far distance to the CG camera,
      wherein when a focus point of the CG camera is between the near distance and the far distance, an object located between the near distance and the far distance is in focus; and
   determining the point between the near distance and the far distance substantially closest to the current focus point of the CG camera.

4. The method of claim 2, comprising:
   for a target object among the multiple target objects:
      creating a first distance, a second distance, and an exact distance,
         wherein the first distance and the second distance indicate region within which a focus point of the CG camera can lie and have the target object in focus,
         wherein the exact distance indicates a distance between the current focus point of the CG camera and the target object; and
      updating which of the first distance, the second distance, and the exact distance are closest to the current focus point of the CG camera.

5. The method of claim 2, comprising:
   receiving an input indicating a magnitude of contribution of the point to changing the focus of the CG camera,
      wherein the magnitude can indicate to partially use the point; and
   changing the focus of the CG camera between the first target object and the second target object by changing the focus of the CG camera from the current focus point to the point associated with the second target object, based on the nonlinear function and the magnitude.

6. The method of claim 1, comprising:
   receiving a user input indicating a magnitude of contribution of the nonlinear function to changing the focus of the CG camera,
      wherein the magnitude can indicate to partially use the nonlinear function; and
   changing the focus of the CG camera between the first target object and the second target object based on the magnitude of contribution of the nonlinear function.

7. The method of claim 1, wherein the nonlinear function comprises an indication of an animation associated with the manner of focus transition between the first target object and the second target object.

8. The method of claim 1, comprising:
   obtaining the nonlinear function substantially inversely proportional to a distance between the CG camera and the current focus point and indicating the manner of focus transition between the first target object and the second target object.

9. The method of claim 1, comprising:
   obtaining the nonlinear function substantially inversely proportional to a square root of a distance between the CG camera and the current focus point and indicating the manner of focus transition between the first target object and the second target object.

10. At least one computer-readable storage medium carrying instructions, which, when executed by at least one data processor of a system, cause the system to:
   obtain an indication of a first target object and a second target object, and camera settings,
      wherein a camera is configured to transition a focus from the first target object to the second target object,
      wherein the camera settings include a current focus point of the camera;
   obtain a nonlinear function indicating a manner of focus transition between the first target object and the second target object; and
   change the focus of the camera between the first target object and the second target object based on the nonlinear function.

11. The non-transitory computer-readable storage medium of claim 10, causing the system to: determine a point associated with the second target object, wherein the point has a property that focusing the camera on the point causes the second target object to be in focus, wherein the point associated with the second target object is closer to the current focus point of the camera than a substantial portion of other points having the property.

12. The non-transitory computer-readable storage medium of claim 11, causing the system to determine the point associated with the second target object by: determining a region of acceptable focus associated with the second target object, wherein the region of acceptable focus is a region between a nearest object and a farthest object that are in focus in an image formed by the camera,
wherein the region of acceptable focus indicates a near distance to the camera and a far distance to the camera, wherein when a focus point of the camera is between the near distance and the far distance, an object located between the near distance and the far distance is in focus; and determining the point between the near distance and the far distance substantially closest to the current focus point of the camera.

13. The non-transitory computer-readable storage medium of claim 11, causing the system to: for a target object: create a first distance, a second distance, and an exact distance, wherein the first distance and the second distance indicate region within which a focus point of the camera can lie and have the target object in focus, wherein the exact distance indicates a distance between the current focus point of the camera and the target object; and update which of the first distance, the second distance, and the exact distance are closest to the current focus point of the camera.

14. The non-transitory computer-readable storage medium of claim 11, causing the system to: receive an input indicating a magnitude of contribution of the point to changing the focus of the camera, wherein the magnitude can indicate to partially use the point; and change the focus of the camera between the first target object and the second target object by changing the focus of the camera from the current focus point to the point associated with the second target object, based on the nonlinear function and the magnitude.

15. The non-transitory computer-readable storage medium of claim 10, causing the system to: obtain an indication of a physical camera lens; retrieve the nonlinear function representing focus behavior of the physical camera lens; and use the nonlinear function to change the focus of the camera.

16. The non-transitory computer-readable storage medium of claim 10, causing the system to: receive a user input indicating a magnitude of contribution of the nonlinear function to changing the focus of the camera, wherein the magnitude can indicate to partially use the nonlinear function; and change the focus of the camera between the first target object and the second target object based on the magnitude of contribution of the nonlinear function.

17. The non-transitory computer-readable storage medium of claim 10, wherein the nonlinear function comprises an indication of an animation associated with the manner of focus transition between the first target object and the second target object.

18. The non-transitory computer-readable storage medium of claim 10, causing the system to: obtain the nonlinear function substantially inversely proportional to a square root of a distance between the camera and the current focus point and indicating the manner of focus transition between the first target object and the second target object.

19. A system comprising:
at least one hardware processor; and
at least one non-transitory memory storing instructions, which, when executed by the at least one hardware processor, cause the system to:
obtain an indication of a first target object and a second target object, and camera settings,
wherein a camera is configured to transition a focus from the first target object to the second target object,
wherein the camera settings include a current focus point of the camera;
obtain a nonlinear function indicating a manner of focus transition between the first target object and the second target object; and
change the focus of the camera between the first target object and the second target object based on the nonlinear function.

20. The system of claim 19, comprising instructions to:
determine a point associated with the second target object,
wherein the point has a property that focusing the camera on the point causes the second target object to be in focus,
wherein the point associated with the second target object is closer to the current focus point of the camera than a substantial portion of other points having the property.

21. The system of claim 20, comprising instructions to determine the point associated with the second target object by:
determining a region of acceptable focus associated with the second target object,
wherein the region of acceptable focus is a region between a nearest object and a farthest object that are in focus in an image formed by the camera,
wherein the region of acceptable focus indicates a near distance to the camera and a far distance to the camera,
wherein when a focus point of the camera is between the near distance and the far distance, an object located between the near distance and the far distance is in focus; and
determining the point between the near distance and the far distance substantially closest to the current focus point of the camera.

22. The system of claim 20, comprising instructions to: for a target object: create a first distance, a second distance, and an exact distance, wherein the first distance and the second distance indicate region within which a focus point of the camera can lie and have the target object in focus, wherein the exact distance indicates a distance between the current focus point of the camera and the target object; and update which of the first distance, the second distance, and the exact distance are closest to the current focus point of the camera.

23. The system of claim 20, comprising instructions to:
receive an input indicating a magnitude of contribution of the point to changing the focus of the camera,
wherein the magnitude can indicate to partially use the point; and
change the focus of the camera between the first target object and the second target object by changing the focus of the camera from the current focus point to the point associated with the second target object, based on the nonlinear function and the magnitude.

24. The system of claim 19, comprising instructions to:
obtain an indication of a physical camera lens;
retrieve the nonlinear function representing focus behavior of the physical camera lens; and use the nonlinear function to change the focus of the camera.

25. The system of claim 19, wherein the nonlinear function comprises an indication of an animation associated with the manner of focus transition between the first target object and the second target object.

26. The system of claim 19, comprising instructions to:
obtain the nonlinear function substantially inversely proportional to a distance between the camera and the current focus point and indicating the manner of focus transition between the first target object and the second target object.

27. The system of claim 19, comprising instructions to:
obtain the nonlinear function substantially inversely proportional to a square root of a distance between the camera and the current focus point and indicating the manner of focus transition between the first target object and the second target object.

* * * * *